United States Patent [19]

Hamilton et al.

[11] Patent Number: 4,691,443
[45] Date of Patent: Sep. 8, 1987

[54] DRIVE-IN, DRIVE-OUT VEHICLE ALIGNMENT SYSTEM

[75] Inventors: Harold F. Hamilton, Liberty, Mo.;
Robert L. Donahue, McPherson, Kans.

[73] Assignee: Hein-Werner Corporation, Waukesha, Wis.

[21] Appl. No.: 910,084

[22] Filed: Sep. 22, 1986

Related U.S. Application Data

[60] Division of Ser. No. 844,030, Mar. 24, 1986, which is a continuation-in-part of Ser. No. 764,678, Aug. 12, 1985, Pat. No. 4,598,481.

[51] Int. Cl.$^4$ .................. G01B 5/03; G01B 11/03
[52] U.S. Cl. ........................... 33/288; 33/299; 33/600
[58] Field of Search ............ 33/180 AT, 181 AT, 288, 33/299

[56] References Cited

U.S. PATENT DOCUMENTS

| | | |
|---|---|---|
| 4,207,681 | 6/1980 | Bayorgeon et al. .................. 33/288 |
| 4,479,305 | 10/1984 | Wendl et al. .......................... 33/288 |
| 4,490,918 | 1/1985 | Clausen ................................. 33/288 |
| 4,513,508 | 4/1985 | Jarman et al. ........................ 33/288 |
| 4,573,273 | 3/1986 | Eck ....................................... 33/288 |
| 4,598,481 | 7/1986 | Donahue ............................... 33/288 |

Primary Examiner—Richard R. Stearns
Attorney, Agent, or Firm—Wm. Bruce Day

[57] ABSTRACT

A vehicle alignment system uses transverse, longitudinal and vertical bars mounted on a vehicle and equating to X, Y and Z axes for establishing the dimensions of the vehicle, which dimensions are then compared to the vehicle engineering specifications. The transverse bars are connected to the underside of the vehicle and, to enable quickness and ease of transferring the alignment system between vehicles, quick connect fittings extend between the transverse and longitudinal bars. Additional supports extend between the longitudinal bars and a base surface. The system is arranged so that transverse bars in a path of entry and exit of the vehicle can be readily removed and the vehicle removed and replaced, while maintaining the alignment system substantially set up and ready for use. The process improves the speed of use of the system by substantially alleviating the dismantling previously required.

10 Claims, 9 Drawing Figures

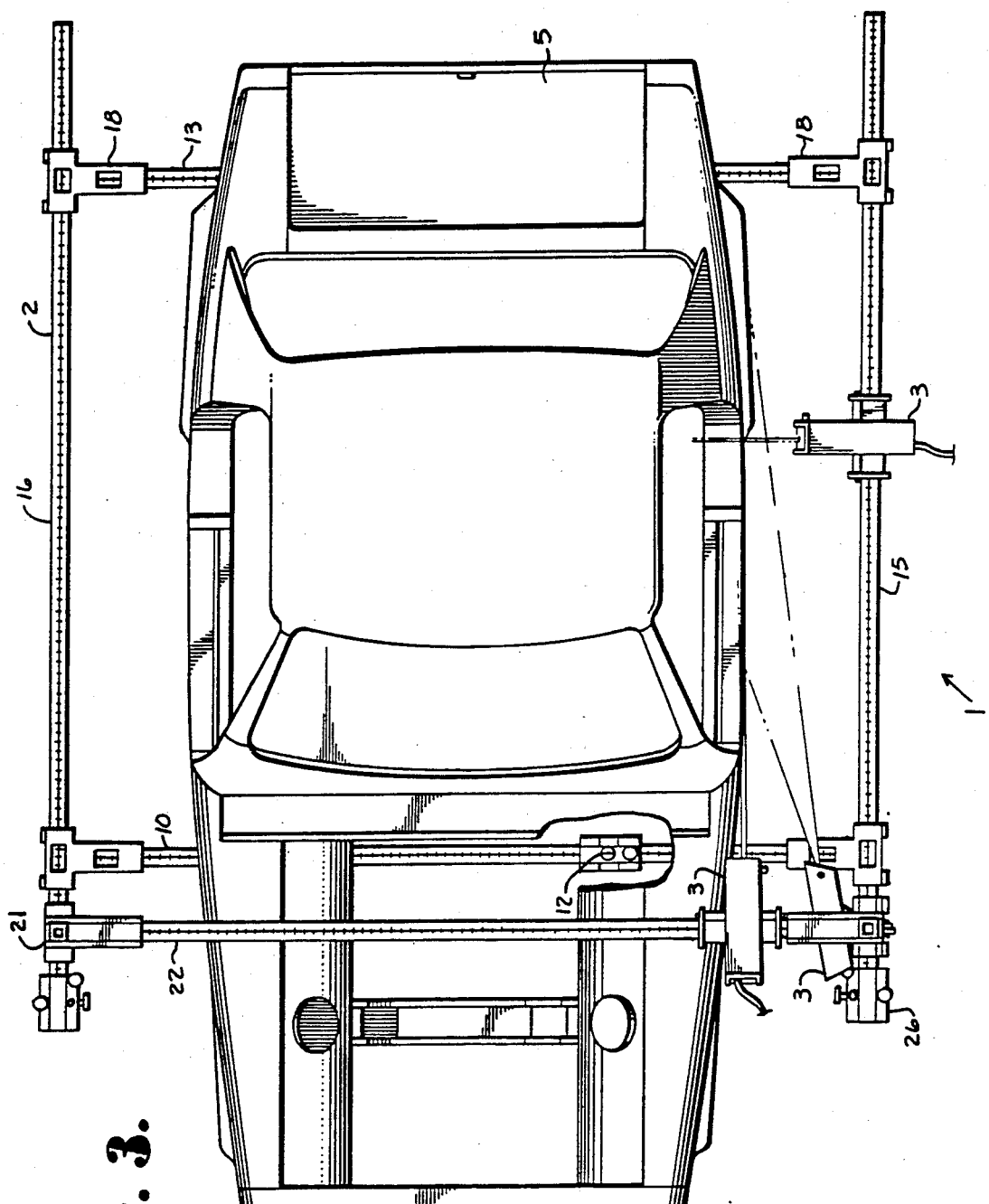

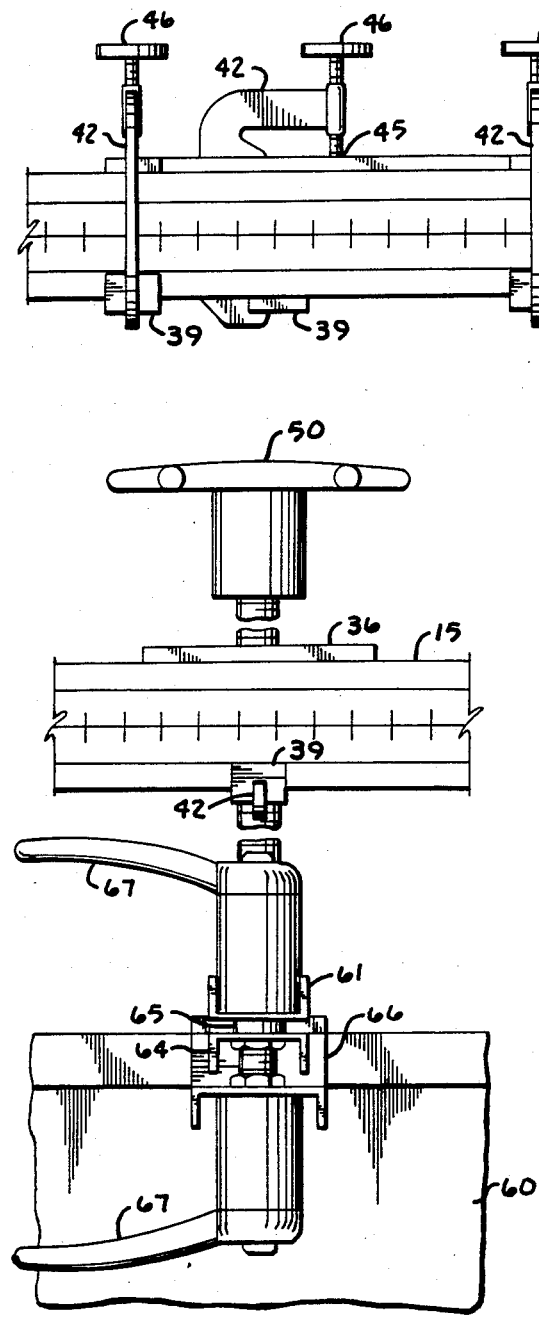
Fig. 5.
Fig. 6.
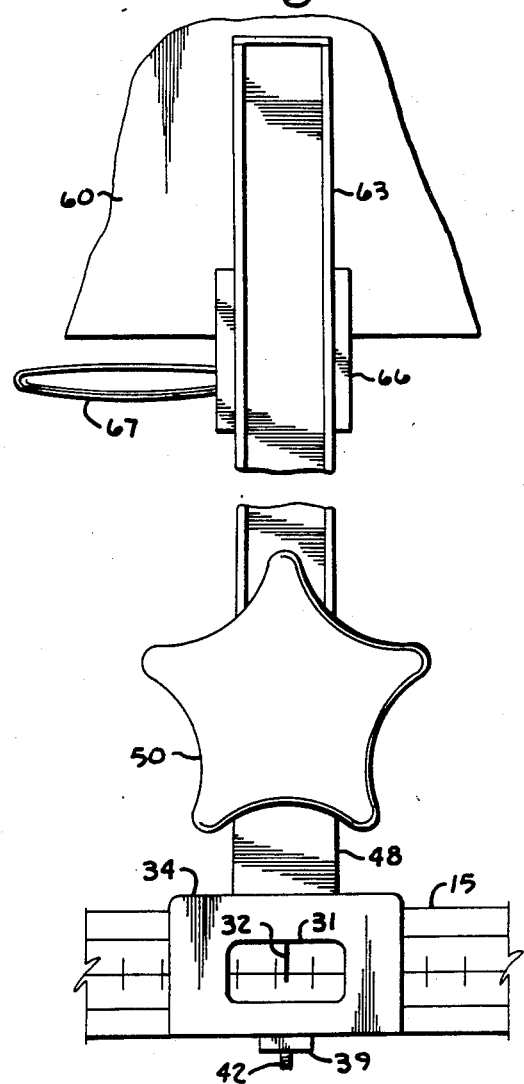
Fig. 7.

DRIVE-IN, DRIVE-OUT VEHICLE ALIGNMENT SYSTEM

CROSS REFERENCE TO RELATED APPLICATION

This is a division, of application Ser. No. 844,030, filed Mar. 24, 1986, which is a continuation-in-part of pending Application Ser. No. 764,678, filed Aug. 12, 1985 and issued July 8, 1986, as U.S. Pat. No. 4,598,481.

FIELD OF THE INVENTION

This invention relates generally to a device for checking and measuring the geometrical relationships of a vehicle frame and body and more particularly, relates to such a device having certain portions which are easily removable and replaceable once the system is set up, which then enables use of the system on successive vehicles in a relatively rapid manner.

BACKGROUND OF THE INVENTION

The frame and body of a vehicle is constructed with respect to precise geometric relationships, as determined by the manufacturer, in order that the vehicle have proper driving and road holding properties as well as accurate exterior design measurement locations for beauty and bilateral symmetry of the finished body. Various apparatuses for effecting straightening of bent and damaged vehicle frame and body parts are known in the art, as are known various gauges, rules and the like for determining the amount of damage to the vehicle, frame and body members. These alignment apparatuses are often unduly complex and cumbersome, require long periods of familiarization and usage for the repairman to become proficient in operation, and often require substantial set up time. In modern frame and body shop practice, it is not desirable for alignment equipment to require an overly long set up time, for this is time which increases the cost of labor for a particular job and ties up the equipment and makes it unavailable for other jobs. In the past, some repairmen have sacrificed accuracy in the repaired product by choosing equipment which, by requiring less set up time, was faster in use but did not provide great accuracy for the finished product.

The present Drive-In, Drive-Out Vehicle Alignment System is an improvement of and is used in conjunction with a vehicle alignment system such as of the type disclosed and shown in U.S. Pat. No. 4,598,481, and also owned by Hein-Werner Corporation, Kansas Jack Division. This alignment system, using orthogonally intersecting lasers or sighting instruments for alignment, is known as the X, Y and Z coordinate laser alignment system and utilizes a three dimensional framework constructed about a vehicle and with sighting instruments projecting straight lines or planes of sight. These lines or planes intersect to measure the location of frame and body parts or they can be set at a reference specification where that frame or body part should be and any displacement from the desired location noted. Thereafter, the frame or body part is repaired by conventional means to bring it back to the manufacturer's specified position.

The X, Y and Z coordinate alignment system may be used when the vehicle is positioned on stands on a workshop floor surface or the vehicle may be positioned upon a work rack for easier access to the undercarriage. When the rack includes various pull towers for exerting force on body parts in the conventional manner, placement upon a work rack is particularly advantageous. The work rack shown in the drawings of the instant application is the Kansas Jack WORLD RACK ®, a U.S. Pat. No. 4,592,225.

The present application provides an apparatus and method by which an alignment system, such the X, Y and Z coordinate alignment system, can be set up or constructed about a vehicle and then certain parts can be removed after the first vehicle is aligned, a second vehicle replaced into the arrangement and then certain connecting members adjusted to the particularities of the individual vehicle. Disassembly of the entire system is thereby made unnecessary and any lengthy initial set up need only be done once. Use of this apparatus and method by a repairman will substantially decrease the time previously associated with vehicle repair and if this savings is passed on to the consumer, should result in lower cost for collision repairs.

OBJECTS OF THE INVENTION

The principal objects of the present invention are: to provide an alignment system designed for rapid connection to vehicles; to provide such an alignment system which enables an alignment system utilizing longitudinal and transverse bars which are connected to a vehicle to be readily mounted to a second vehicle thereby reducing set up time; to provide an alignment system which is adaptable to either floor or rack use; and to provide such an alignment apparatus and method which is relatively easy to use and understand, adaptable in many situations; and which operators can be easily trained to use.

Other objects and advantages of this invention will become apparent from the following description taken in connection with the accompanying drawings wherein are set forth, by way of illustration and example, certain embodiments of this invention.

BRIEF DESCRIPTION OF THE DRAWINGS

FIG. 3 is a plan view of the alignment apparatus of FIG. 2 mounted on a vehicle.

FIG. 5 is a side view of the quick couple tee connector.

FIG. 6 is an enlarged, plan view of a rack adaptor used with the present invention.

FIG. 7 is a top view of a rack adaptor.

DESCRIPTION OF THE PREFERRED EMBODIMENTS

Figure 1:
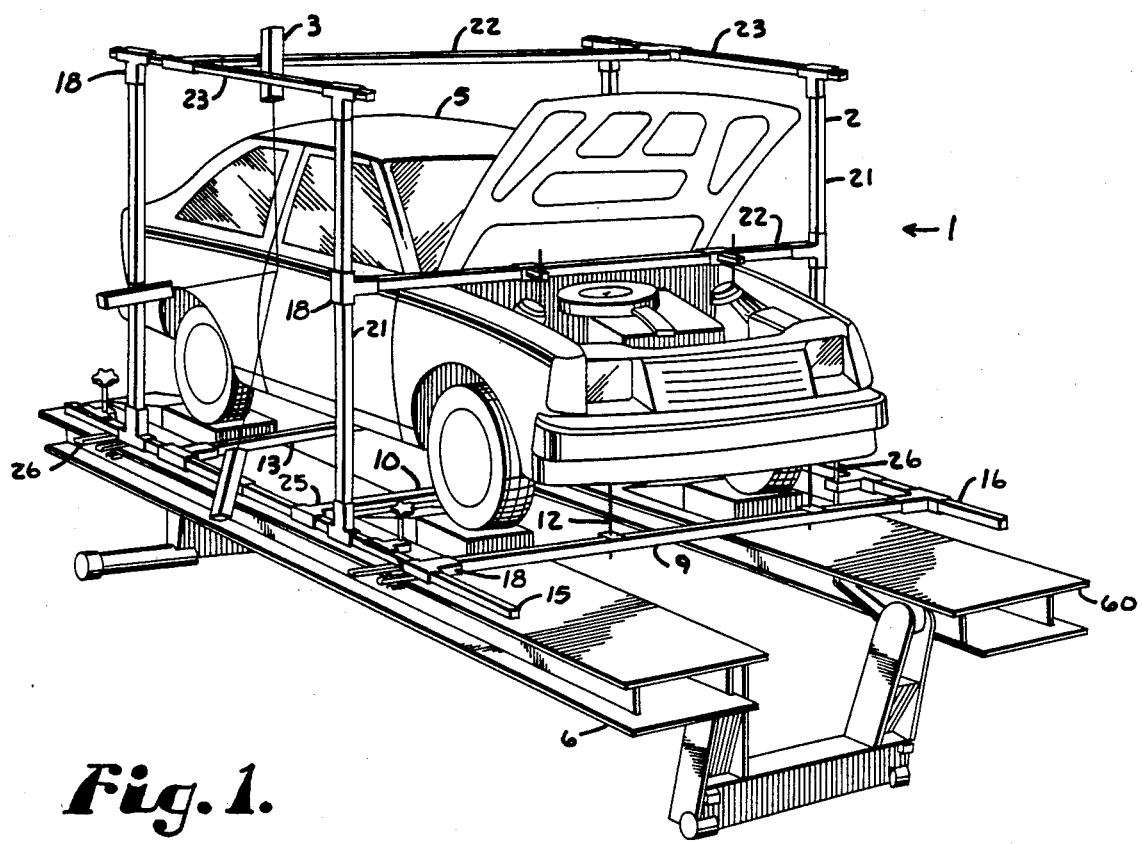
FIG. 1 is a perspective view of the Drive-In, Drive-Out Vehicle Alignment System in conjunction with a vehicle positioned upon a work rack.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally indicates a Drive-In, Drive-Out Vehicle Alignment System embodying the present invention. The system 1 includes a frame arrangement 2, constructed so as to have X, Y and Z axes and which supports sighting instruments such as beam or plane projecting laser instruments 3 mounted to have the projected beams or planes intersect at selected points, thereby establishing a point defined by X, Y and Z coordinates. The proper X, Y and Z coordinate position of each vehicle part is listed as separate dimensions in a reference manual provided to the repairman. Use of the apparatus in conjunction with the reference manual permits the repairman to accurately and quickly measure errors in the position of the vehicle part, which errors can result from improper construction, or through damage.

In the illustrated example, the frame arrangement 2 is mounted about a vehicle 5 which is positioned upon a vehicle work rack 6 which may be the type disclosed in U.S. Pat. No. 4,592,225. This patent is incorporated herein by reference.

In the illustrated example, the frame arrangement 2 is the same or substantially the same as that set forth in commonly assigned U.S. Pat. No. 4,592,225. This patent is directed to an Intersecting Laser Alignment Apparatus and Method, or X, Y and Z coordinate alignment system, in which includes a frame work of transverse bars equating to an X axis, longitudinal bars equating to a Y axis and vertical bars equating to a Z axis. Crossbars can be positioned between upper portions of the vertical bars and equate to an X axis for upper body measurements and upper longitudinal bars could also be positioned between the vertical bars for upper body measurements and equate to a Y axis. In the illustrated example, FIGS. 1, 2 and 3, the frame arrangement 2 includes at least first and second transverse bars 9 and 10. All of the transverse bars positioned beneath the undercarriage of the vehicle 5 are positioned with respect to the vehicle geometry by mounting to vehicle fixture holes with hanger means 12 which include fingers and an adjustable length shaft, as set forth in U.S. Pat. No. 4,598,481.

As shown in FIG. 1, the first transverse bar 9 is connected to the vehicle forward of the front wheels, such as to the frame horn areas. As used herein, the vehicle front is defined as that part of the vehicle which is first driven onto the work rack 6. As shown, the vehicle is positioned on the rack with the vehicle front end first in the rack, although for purposes of definition in this specification, if the vehicle were backed onto the rack then the back end would be termed the front end. Thus as shown, the first transverse bar 9 is positioned by the hanger means 12 forward of the vehicle front wheels and the second transverse bar 10 is connected to the vehicle aft of the vehicle front wheels.

In the illustrated example, there is a third transverse bar 13 which is also connected to the vehicle 5 and also positioned aft of the vehicle front wheels. The transverse bars 9, 10 and 13 are all positioned generally in the vehicle datum plane. The datum plane is an imaginary plane established below the undercarriage of the vehicle during the vehicle engineering process and from which vertical measurements originate to various points on the vehicle undercarriage. Normally, these locations accord to fixture holes. The datum plane is often established approximately 100 mm below the lowest point on the vehicle frame and so the datum plane, and therefore the transverse bars, are located between the undercarriage of the vehicle and the bottom surface of the vehicle tires. The mid portions of the transverse bars 9, 10 and 13 are aligned with the vehicle longitudinal center line.

Mounted on opposite ends of the transverse bars 9, 10 and 13 are the longitudinal bars 15 and 16, which are situated perpendicular to the transverse bars 9, 10 and 13, and parallel and equidistantly spaced from the vehicle centerline. The longitudinal bars 15 and 16 equate to the Y axis and are preferably of sufficient length to extend the length of the vehicle 5. The longitudinal bars 15 and 16 are connected to the transverse bars 9, 10 and 13 by connectors such as tee connectors 18.

Figure 2:
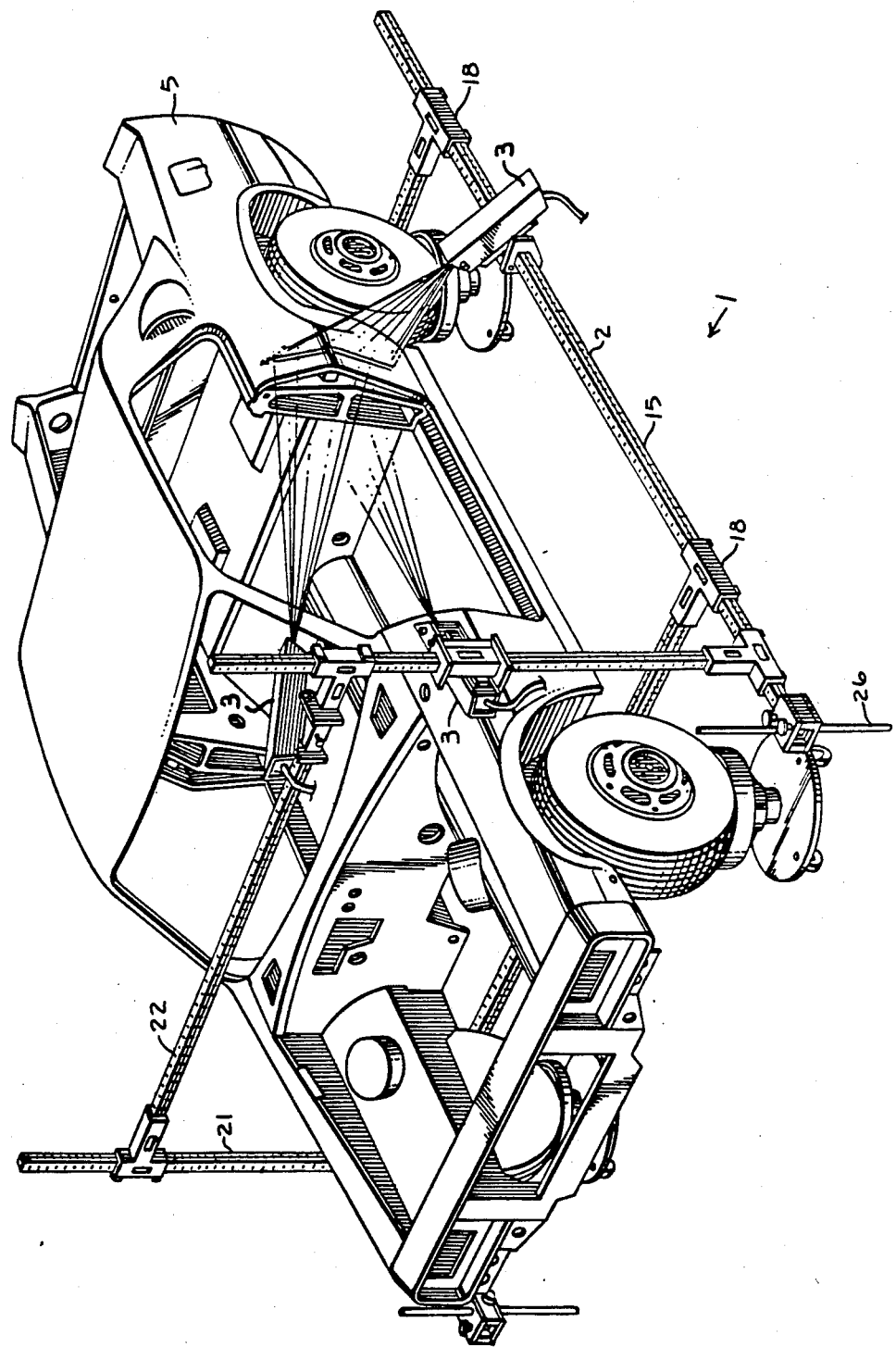
FIG. 2 is a perspective view of a three dimensional alignment system, slightly different embodiment, mounted upon a vehicle of space frame construction.

In the exemplary frame arrangement 2, vertical or height bars 21 extend upwardly from the longitudinal bars 15 and 16 and constitute a Z axis, FIGS. 1, 2 and 3. The vertical bars 21 are positioned for upper body measurement and the arrangement 2 may include upper crossbars 22 and upper longitudinal bars 23, FIG. 1, all connected by the tee connectors 18. All of the bars include scale indicia for measurement, the zero points of the indicia, and therefore the origin of the X, Y and Z coordinates, being established to accord with the body and frame dimension book.

As described above, the frame arrangement 2 is constructed about the vehicle 5 and must be disassembled into the separate frame bars for separation of the frame arrangement from the vehicle 5. Construction of the frame arrangement 2 about the vehicle 5 can be a lengthy and time consuming task and, since careful assembly is critical to obtain the correct measurements for the vehicle 5, the task must be done relatively slowly and deliberately.

Prior to the instant invention, separation of the frame arrangement 2 from the vehicle 5 was done by disassembling the frame arrangement in the reverse order from assembly; that is, taking down first the upper crossbars and longitudinal bars 22 and 23, then removing the vertical bars 21, then the longitudinal bars 15 and 16 and finally the transverse bars 9, 10 and 13. The present system makes it unnecessary to completely disassemble the frame arrangement 2 when a subject vehicle has been aligned and repaired and in preparation for working on a second vehicle. With this arrangement, the frame arrangement 2 has quick couple tee connectors 25 and support means 26 which extend from the longitudinal bars 15 and 16 to a base surface and maintain the longitudinal bars a distance thereabove. As stated above, the vehicle 5 and frame arrangement 2 can be situated on either a shop floor surface, FIGS. 2 and 3, or as shown in FIG. 1, upon a vehicle work rack. In either case, the surface on which the vehicle is situated provides the base surface for support of the frame arrangement 2 through use of the support means 26, FIG. 1.

Figure 4:
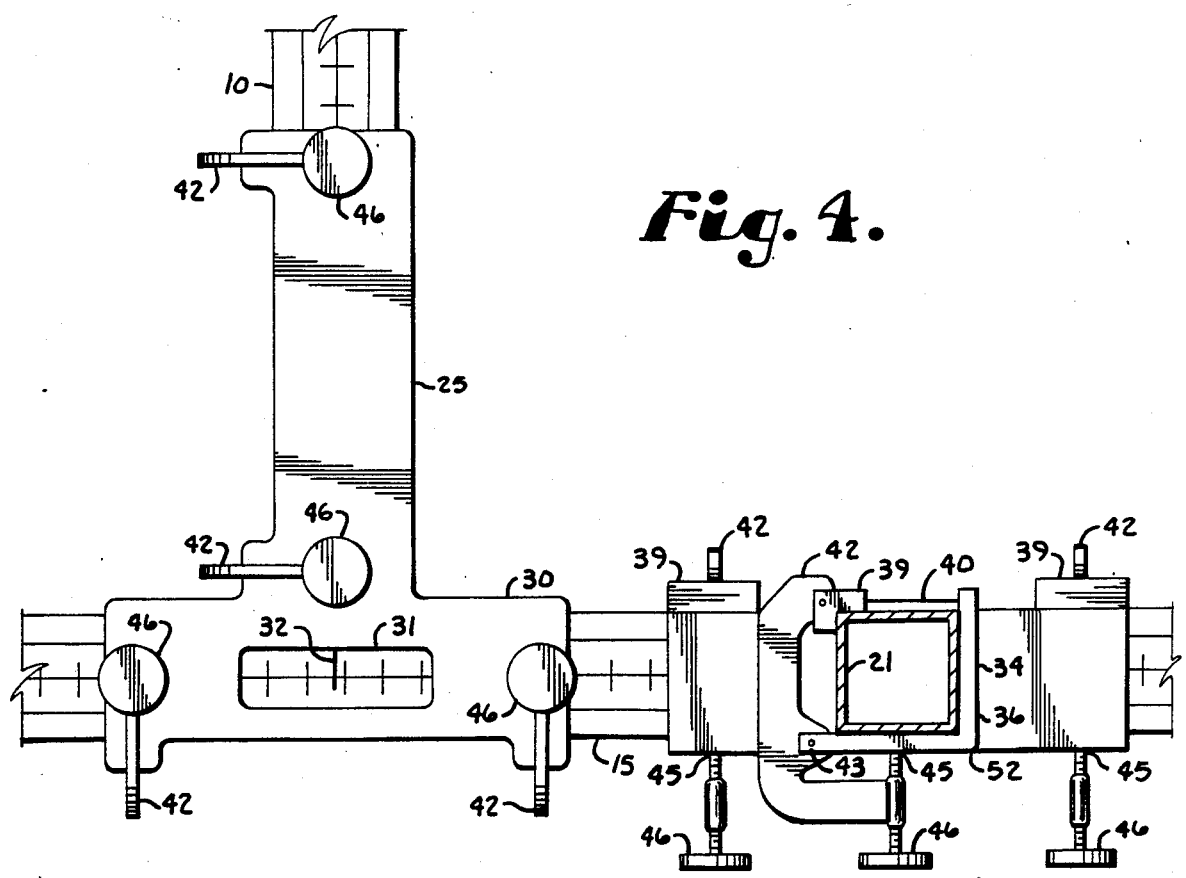
FIG. 4 is an enlarged, plan view of a quick couple tee connector used herewith.

In the illustrated example, FIGS. 4 and 5, the quick couple tee connectors 25 join at least those transverse bars which would be in the way of the vehicle 5 if it were driven out of the frame arrangement 2, leaving at least one bar extending between the longitudinal bars 15 and 16, directly or indirectly, in which would interfere with movement from the frame arrangement 2.

According to the embodiment shown in FIG. 1, it has proved procedurally advantageous to drive the vehicle forward onto the work rack 6 and then back the vehicle off the rack when alignment and corrections are accomplished. Under this procedure, the first transverse bar 9 is left in place, connecting the longitudinal bars 15 and 16, and the second transverse bar 10 and third transverse bar 13, when present, are removed for exit and entry of vehicles.

For those transverse bars which need to be removed for transfer of vehicles, the quick couple tee connectors 25 are employed. Referring to FIGS. 4 and 5, an exemplary quick couple tee connector is shown, and which includes a tubular portion 30 having a centrally located window 31 and marker 32 for receiving one of the bars such as one of the longitudinal bars 15 and 16. A quick couple portion 34 extends perpendicularly from the tubular portion 30 for ease of joining the transverse bar to the longitudinal bar. In this example, the quick couple portion 34 includes a backstop 36, such as of angle beam configuration, and a clasp means 37 extending from the backstop 36 to cradle the end of the transverse bar between the clasp means 37 and the backstop 36. In the illustrated example, the clasp means 37 includes an L-shaped holder 39 with spring connectors 40 extending from the holders to the backstop bracket 36 to define an area for receipt of one of the bar ends and a tensionable finger 42 extending from the backstop bracket 36 to the holder 39 for urging the holder toward and away from the bar received therebetween. The tensionable finger 42 rocks back and forth on a central hinge 43. A screw tip 45 merely rests in an indentation in the backstop bracket 36 to provide rocking of a tension screw 46 relative to the hinge 43.

Figure 8:
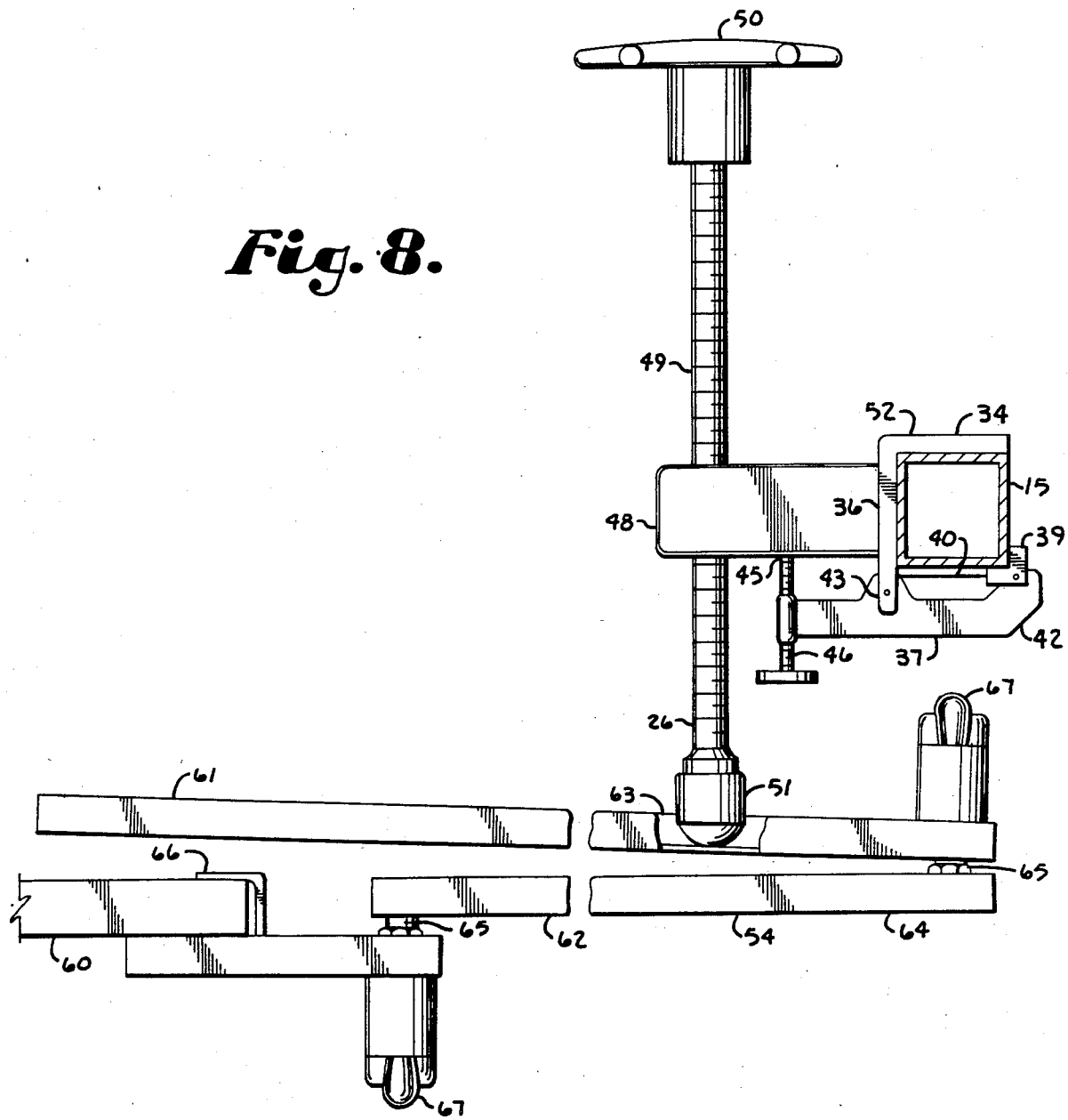
FIG. 8 is a front side view of rack adaptor.
Figure 9:
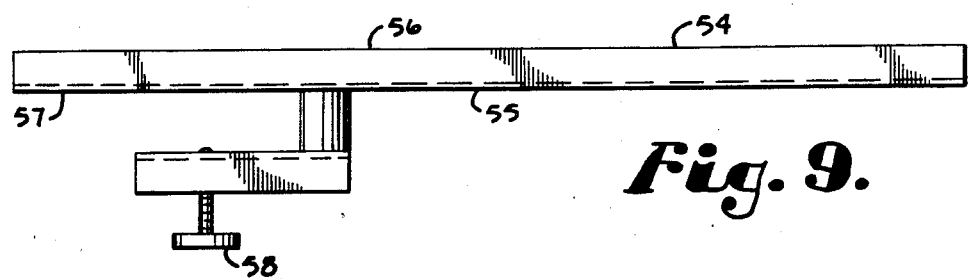
FIG. 9 is an elevational view of an alternative embodiment of a rack adaptor.

The support means 26 extend from the longitudinal bars to a base surface, which can be either a work shop floor surface, FIGS. 2 and 3, or, as in the illustrated example FIG. 1, a work rack 6. For support above the base surface, a screw jack 48 may be employed. The screw jack 48, FIGS. 7 and 8, consists of a tubular holder 52 for sleeving on the longitudinal bars 15 and 16, a screw jack shaft 49 extending therefrom, an upper knob 50 for rotation and a lower ball and socket end 51. In the illustrated example, FIG. 1, there are four such screw jacks 48 placed on the longitudinal bars 15 and 16, such as located adjacent the forward and rear ends of each of the bars 15 and 16. When the support means 26 is used upon a floor surface, the ball and socket end 51 contacts the shop floor and provides ease of movement of the frame arrangement 2 for slight shifting of the arrangement 2 on the floor as it is adjusted to a new vehicle. When the frame arrangement 2 is used in conjunction with the work rack 6, the ball and socket end 51 of the support means 26 provides the same function of allowing slight shifting as necessary to accommodate different size vehicles. When used on the work rack 6, out riders in the form of rack adaptors 54 are employed, which consists of in a first embodiment 55, FIG. 9, of an open channel arm 56 with a fork end 57 and a thumb screw 58 extending through the fork end 57, for tightening upon a flange 60 of the rack 6. In a second embodiment 61, FIG. 8, the rack adaptor 54 is provided with a jointed or swivel arm arrangement 62 including an open channel arm portion 63 and a bottom arm portion 64 connected by lever nut tightened swivels 65. The bottom arm portion 64 has a fork end 66 also tightened by a pigtail screw 67. The second embodiment 61, of the rack adaptor 54, is also positioned on the rack flange 60 and is employed as hereinafter described.

In the use of the Drive-In, Drive-Out Vehicle Alignment System 1, the frame arrangement 2 is first constructed about a selected vehicle 5. To erect the frame arrangement 2, it is easier if the vehicle is placed on a work rack 6 as shown in FIG. 1. At least first and second transverse bars 9 and 10 are positioned and depended from the vehicle undercarriage perpendicular to the vehicle centerline with the first transverse bar 9 located forwardly of the vehicle front wheels and the second transverse bar also positioned perpendicular to the vehicle centerline, but aft of the front wheels and with both the first and second transverse bars 9 and 10 generally located in the vehicle datum plane.

Longitudinal bars 15 and 16 are mounted to opposite ends of the transverse bars 9 and 10 and parallel and equidistant from the vehicle centerline. Although standard tubular tee connectors may be used in the connection of the first transverse bar 9 to the longitudinal bars 15 and 16, it is preferable to employ quick couple connectors such as the connectors 25 in mounting the longitudinal bars 15 and 16 to the second transverse bar 10. This will enable the second transverse bar 10 to be readily removed, leaving the longitudinal bars 15 and 16 in place, and supported by the support means 26 and maintained in joined relationship by the first transverse bar 9. The support means 26 are provided, such as by connecting the screw jacks 48 to the longitudinal bars 15 and 16, as at front and rear ends of each. The screw jack shafts 49 are extended until the ball and socket end 51 engages the base surface and maintains the longitudinal bars 15 and 16 above the base surface independently of any connection of the transverse bars to the vehicle.

With the transverse bars 9 and 10 and the longitudinal bars 15 and 16 in place, the frame arrangement 2 is constructed sufficiently for two-dimensional, or X and Y, measurements to be taken. Generally, however, the vehicle measurements may need to be established in the third dimension, or Z axis, and, if this is the case, the vertical bars 21, upper crossbars 22 and upper longitudinal bars 23 are mounted to construct the framework shown in FIG. 1.

A plurality of laser instruments 3 are mounted on the frame arrangement 2. In the illustrated example, the laser instruments are each low powered industrial lasers such as used for surveying and calibration and are each capable of projecting either a cylindrical or pencil beam of laser generated light, or a plane or fan of light. These two modes generate a fan scan pattern of light formed by either a planar ray, or by sweeping a beam in a plane. Such an instrument is described in U.S. Pat. No. 4,578,870, licensed to the Kansas Jack Division of Hein-Werner Corporation. Each of the laser instruments 3 is mounted on carriage selectively positionable on the appropriate bar, whether it be the datum plane or longitudinal bars 15 or 16, the vertical bars 21, the transverse bars 9, 10 or 13, the upper crossbars 22, or the upper longitudinal bars 23. The laser instrument 3 is mounted to the carriage by a pivot so that the laser 3 may sweep perpendicularly with respect to the orientation of the carriage to project the fan scan pattern.

To establish the X, Y and Z coordinate system 1 on the framework 2, one of the laser instruments 3, by its carriage, is mounted on an X axis bar, such as the transverse bars 9, 10 or 13, or the upper crossbars 22 to project a plane of light. Another of the laser instruments 3 is mounted on a Y axis bar, either of the longitudinal bars 15 or 16 or the upper longitudinal bars 23 to project a plane of light. Another laser instrument 3 is mounted on a Z axis bar, the vertical bars 21 to project a plane of light. Two sighting instruments 3 are employed to provide an X-Y coordinate system, one mounted on an X axis bar and the other mounted on a Y axis bar so that the planes of light intersect. To provide a vertical dimension for upper body measurement, or Z axis, a laser instrument 3 is mounted on one of the two axis bars, the vertical bars 21. As indicated in connection with FIG. 1, the laser instruments 3 are positioned on their carriages to provide the fan scan pattern of light which is orthogonally oriented. The vertically oriented planes of light from the laser instruments 3 mounted on the X axis bar and the Y axis bar meet in a vertically extending line, FIG. 1. The laser instrument 3 mounted on the Z axis bar and projects a horizontal plane of light. The intersection of the three planes of light, two vertical and one horizontal, provides a three dimensional crosshair point at which measurements are taken.

When the alignment system 1 is used on a work rack 6, rack adaptors 54 are employed to extend the support or base surface of the rack 6. The first embodiment 55 of the rack adaptor 54 may be employed and the adaptor is positioned so that the open channel arm 56 extends perpendicularly from the rack margin and cradles the ball and socket end 51 of the screw jack 48. With this arrangement, the frame arrangement 2 may be shifted laterally with respect to a vehicle located on the support surface, such as the rack 6, by loosening any connection between the vehicle 5 and the frame arrangement bars, such as the hanger means 12 which connect the vehicle directly to the first and second transverse bars 9 and 10. Once loosened, the transverse bars 9 and 10 can be slid laterally and the longitudinal bars 15 and 16 will follow because the ball and socket end 51 is free to move. This ability is necessary because when placing a second vehicle on the rack 6, centerline of the second vehicle would only fortuitously be located where the centerline of the first vehicle was located with respect to the rack.

The second embodiment 61 of the rack adaptor 54 is particularly useful to move the entire frame arrangement 2 forwardly and rearwardly relative to the work rack 6. This is desirable when there are significant differences in length between vehicles to be aligned by the frame arrangement 2. In this case, the repairman may desire to move the frame arrangement 2 forwardly or rearwardly on the rack 6 in order to take advantage of any force supplying structure such as pull towers located at one end or the other on the rack 6. With the second embodiment 61, the open channel arm portion 63 can be positioned at a 90 degree angle to the bottom arm portion 64, which is in turn attached to the rack flange 60 and then the arm portion 63 become aligned longitudinally with the periphery of the rack 6 and the centerline of the vehicle, if the vehicle is positioned straight on the rack.

When alignment and repairs have been accomplished on the vehicle 5, any of the transverse bars located in the path of movement of the vehicle, such as the transverse bars 10 and 13, are removed by use of the quick couple tee connectors 25, dropped down and pulled out of the frame arrangement 2 and the vehicle 5. A second vehicle then replaces the first vehicle by being moved into the frame arrangement 2 and the first transverse bar 9, second transverse bar 10 and third transverse bar 13, if any, reconnected to the vehicle, shifted laterally if necessary to place the bar center point on line with the vehicle centerline and then the hanger means 12 secured to prevent further shifting.

As will be appreciated, particularly when the upper body vertical bars 21, upper crossbars 22 and upper longitudinal bars 23 are placed in the frame arrangement 2, assembly of the arrangement can be time consuming and disassembly almost equally so. Therefore, removal of only those parts necessary to remove the vehicle from the frame arrangement, namely, the transverse bars located in the path of movement of the vehicle, provides significant time savings, with the frame arrangement 2 able to remain erect after disconnection from the vehicle by means of the remaining transverse bar 9 and the support means 26 positioned therearound.

It is to be understood that while certain forms of the present invention have been illustrated and described herein, it is not to be limited to the specific forms or arrangement of parts herein described and shown except insofar as such limitations are included in the following claims.

What is claimed and desired to be secured by Letters Patent is as follows:

1. A drive-in, drive-out alignment system comprising:
   (a) first and second transverse bars and hanger means extending therefrom for connection to a first vehicle, said first transverse bar being connected to the vehicle forward of the vehicle front wheels, and said second transverse bar being connected to the vehicle aft of the vehicle front wheels;
   (b) spaced, parallel longitudinal bars mounted normally to opposite ends of said transverse bars and extending parallel to the vehicle centerline;
   (c) tee connectors joining said longitudinal bars to said first transverse bar;
   (d) quick couple tee connectors joining said longitudinal bars to said second transverse bar for ready connection and disconnection; and
   (e) support means extending from said longitudinal bars to a base surface and maintaining said longitudinal bars a set distance thereabove; whereby said second transverse bar is removable by said quick couple tee connectors and said longitudinal bars remain supported for ease of removing and replacing said vehicle with a second vehicle and quickly repositioning said second transverse bar to said second vehicle for alignment.

2. The alignment system set forth in claim 1 including:
   (a) vertical height bars mounted to said longitudinal bars by tee connectors; and
   (b) upper transverse bars extending between said vertical height bars.

3. The alignment system set forth in claim 1 wherein:
   (a) said quick couple tee connectors respectively include a tubular portion having a centrally located window and marker for receiving said longitudinal bars and a quick couple portion extending perpendicularly therefrom and including a backstop and clasp means.

4. The alignment system set forth in claim 3 wherein:
   (a) said backstop includes an angle bracket;
   (b) said clasp means includes L-shaped holder with spring connectors extending from said holders to said bracket to define an area for receipt of one of said bars and a tensionable finger extending from said bracket to said holder for urging the holder toward and away from said bar.

5. The alignment system set forth in claim 1 wherein:

(a) said support means includes a tubular connector sleeved on a respective one of said longitudinal bars and having a screw shaft extend downwardly therefrom with a ball and socket at a shaft lower end and a hand knob at a shaft upper end.

6. The alignment system set forth in claim 1 wherein:
(a) said vehicle, first and second transverse bars, and longitudinal bars are all positioned upon a vehicle work rack and elevated above a floor surface;
(b) adaptor arms are mounted to and extend outwardly from said rack to comprise said base surface and said support means engage said adaptor arms.

7. The alignment system set forth in claim 6 wherein:
(a) said adaptor arms include first and second arm portions connected by a swivel joint whereby said transverse bars and longitudinal bars are movable forwardly and rearwardly on said rack to accommodate different lengths of vehicles.

8. A drive-in, drive-out alignment system comprising:
(a) a work rack for supporting a vehicle above a floor surface for ease of access thereto;
(b) at least first and second transverse bars mounted transversely to the centerline of a vehicle and supported by hangers extending from vehicle fixture holes; the first transverse bar being located forward of the vehicle front wheels and positioned generally in the vehicle datum plane and the second transverse bar located aft of the vehicle front wheels and also in the vehicle datum plane;
(c) spaced, parallel, longitudinal bars mounted normally to opposite ends of said transverse bars and extending parallel to the vehicle centerline;
(d) tee connectors joining said longitudinal bars to said first transverse bar;
(e) quick couple tee connectors joining said longitudinal bars to said second transverse bar for ready connection and disconnection;
(f) at least four adaptor arms mounted to margins of said rack and extending outwardly thereof; and
(g) support rods mounted to said longitudinal bars and extending downwardly to engage said adaptor arms and maintain said transverse bars above a rack surface without said transverse bars depending from a vehicle, and whereby said second transverse bar is easily removable from said vehicle and said longitudinal bars by said quick couple tee connectors so that a first vehicle can be aligned and removed from said rack and thereafter a second vehicle positioned on said rack and said transverse bars connected thereto.

9. A method of establishing a drive-in, drive-out alignment system comprising the steps of:
(a) providing a vehicle;
(b) providing at least first and second transverse bars and depending a first transverse bar perpendicular to the vehicle centerline and located forwardly of the vehicle front wheels, and depending the second transverse bar also perpendicular to the vehicle centerline and aft of the front wheels with both the first and second transverse bars generally located in the vehicle datum plane;
(c) providing longitudinal bars and mounting the longitudinal bars to opposite ends of the transverse bars and parallel and equidistant to the vehicle centerline;
(d) providing quick couple connectors in the mounting of the longitudinal bars to the second transverse bar;
(e) providing support means and mounting the support means to the longitudinal bars to position and maintain the longitudinal bars above a base surface independently of any connection of the transverse bars to the vehicle;
(f) disconnecting the second transverse bar from the vehicle, and from the longitudinal bars by use of the quick couple connectors, and removing the vehicle rearwardly from the remaining first transverse bar and the longitudinal bars;
(g) positioning a second vehicle between the longitudinal bars and adjacent the first transverse bar; and
(h) replacing and depending the second transverse bar from the second vehicle with the second transverse bar located aft of the second vehicle front wheels.

10. The method set forth in claim 9 including:
(a) shifting the transverse bars and longitudinal bars laterally relative to the second vehicle to locate the longitudinal bars equidistant from the vehicle centerline.

* * * * *